United States Patent
Charlier

(10) Patent No.: US 6,699,919 B1
(45) Date of Patent: Mar. 2, 2004

(54) POLYPROPYLENE HAVING IMPROVED LONG CHAIN BRANCHING

(75) Inventor: Yves Charlier, Nivelles (BE)

(73) Assignee: Atofina Research, Feluy (BE)

( * ) Notice: Subject to any disclaimer, the term of this patent is extended or adjusted under 35 U.S.C. 154(b) by 0 days.

(21) Appl. No.: 09/936,980

(22) PCT Filed: Mar. 20, 2000

(86) PCT No.: PCT/EP00/02573

§ 371 (c)(1),
(2), (4) Date: Jan. 4, 2002

(87) PCT Pub. No.: WO00/56794

PCT Pub. Date: Sep. 28, 2000

(30) Foreign Application Priority Data

Mar. 19, 1999 (EP) ............................................. 99105661

(51) Int. Cl.[7] .................................................. C08J 3/28
(52) U.S. Cl. ........................ 522/149; 522/158; 522/161
(58) Field of Search ................................ 522/149, 158, 522/161, 912

(56) References Cited

U.S. PATENT DOCUMENTS

| | | |
|---|---|---|
| 2,948,666 A | 8/1960 | Lawton |
| 5,411,994 A | 5/1995 | Galli et al. |
| 5,554,668 A | 9/1996 | Scheve et al. |
| 5,560,886 A * | 10/1996 | Saito et al. ................. 522/129 |
| 5,605,936 A | 2/1997 | DeNicola, Jr. et al. |
| 5,883,151 A | 3/1999 | Raetzsch et al. |
| 6,136,926 A | 10/2000 | Raetzsch et al. |

FOREIGN PATENT DOCUMENTS

| | | |
|---|---|---|
| CA | 2198651 | 2/2002 |
| EP | 519341 | 12/1992 |
| EP | 520773 | 12/1992 |
| EP | 792905 | 9/1997 |
| EP | 821018 | 1/1998 |

* cited by examiner

Primary Examiner—James J. Seidleck
Assistant Examiner—Olga Asinovsky
(74) Attorney, Agent, or Firm—William D. Jackson

(57) ABSTRACT

Polypropylene having improved long chain branching increased melt strength obtained by irradiating polypropylene with an electron beam having an energy of at least 5 MeV and with a radiation dose of from 5 to 100 kGray in the presence of a grafting agent, the branching index of the obtained polypropylene being lower than 0.7.

15 Claims, 1 Drawing Sheet

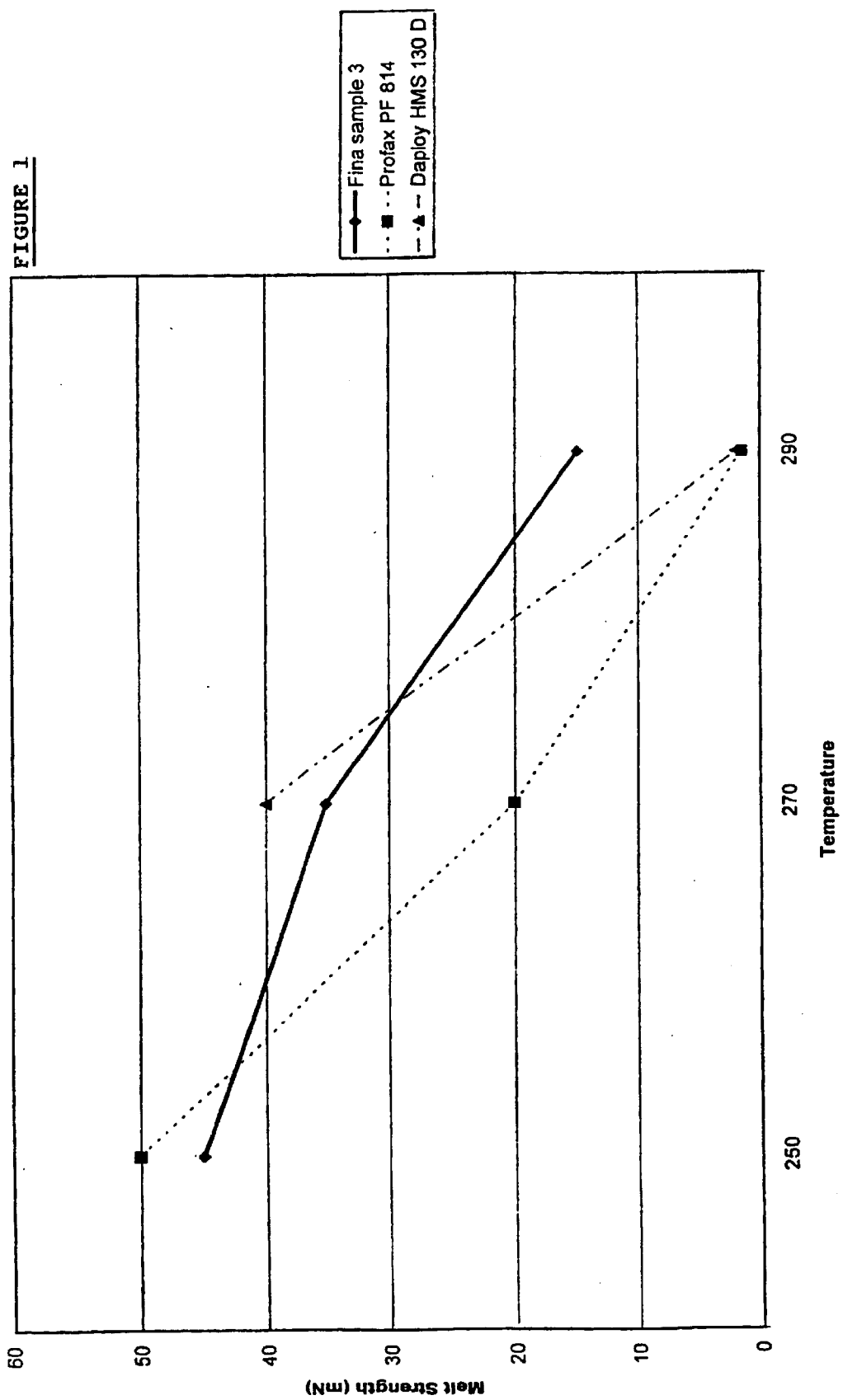

POLYPROPYLENE HAVING IMPROVED LONG CHAIN BRANCHING

The present invention relates to polypropylene having improved long chain branching particularly such polypropylene presents high melt strength, recovery compliance and/or good relaxation time. The polypropylene with improved long chain branching of the present invention is obtained by irradiating polypropylene with a high energy electron beam in the presence of a grafting agent.

Polypropylene resin is used in a variety of different applications. However, polypropylene resin suffers from the problem of having a low melt strength, which restricts the use of polypropylene in a number of applications because the polypropylene is difficult to process. It is known in the art to increase the melt strength of polypropylene, for example by irradiating the polypropylene with an electron beam. It is known that electron beam irradiation significantly modifies the structure of a polypropylene molecule. The irradiation of polypropylene results in chain scission and grafting (or branching) which can occur simultaneously. Up to a certain level of irradiation dose, it is possible to produce from a linear polypropylene molecule having been produced using a Ziegler-Natta catalyst, a modified polymer molecule having free-end long branches, but the properties are not significantly improved.

For example, U.S. Pat. No. 5,554,668 discloses a process for irradiating polypropylene to increase the melt strength thereof. An increase in the melt strength is achieved by decreasing the melt flow rate, otherwise known as the melt index. It is disclosed that a linear propylene polymer material is irradiated with high energy ionising radiation, preferably an electron beam, at a dose rate in the range of from about 1 to $1 \times 10^4$ Mrads per minute for a period of time sufficient for a substantial amount of chain scission of the linear, propylene polymer molecule to occur but insufficient to cause gelation of the material. Thereafter, the material is maintained for a period of time sufficient but too long for a significant amount of long chain branches to form. Finally, the material is treated to deactivate substantially all free radicals present in the irradiated material. In addition, the specification discloses the use of a very broad range of dose rates i.e. from 1 to $1 \times 10^4$ Mrads per minute. High dose rates of greater than about 40 Mrad can result in a substantially fully cross-linked structure of the polypropylene. Such a cross-linked structure is difficult to process.

CA-A-2198651 discloses a continuous method for producing polypropylene mixtures of increased stress-crack resistance and melt strength in which a low-energy electron beam accelerator with an energy of from 150 to 300 keV at a radiation dose of 0.05 to 12 Mrads is employed. This process also suffers from the disadvantage that the production rate of the irradiated powder can be somewhat low for commercial acceptance. Moreover, the polypropylene powder to be irradiated must be in the form of very fine particles. The specification discloses that bifunctional, unsaturated monomers can be added before and/or during the irradiation. Such compounds may include divinyl compounds, alkyl compounds, dienes, or mixtures thereof. These bifunctional, unsaturated monomers can be polymerised with the help of free radicals during the irradiation. However, no indication is given on how to proceed to improve the long chain branching of the polypropylene.

EP-A-0520773 discloses an expandable polyolefin resin composition including polypropylene optionally blended with polyethylene. In order to prepare a cross-linked foam, a sheet of expandable resin composition is irradiated with ionising radiation to cross-link the resin. The ionising radiation may include electron rays, at a dose of from 1 to 20 Mrad. It is disclosed that auxiliary cross-linking agents may be employed which include a bifunctional monomer, exemplified by 1,9-nonanediol dimethyacrylate.

U.S. Pat. Nos. 2,948,666 and 5,605,936 disclose processes for producing irradiated polypropylene. The latter specification discloses the production of a high molecular weight, non-linear propylene polymer material characterised by high melt strength by high energy irradiation of a high molecular weight linear propylene polymer. It is disclosed that the ionising radiation for use in the irradiation step may comprise electrons beamed from an electron generator having an accelerating potential of 500 to 4000 kV. For a propylene polymer material without a polymerised diene content, the dose of ionising radiation is from 0.5 to 7 Mrad. For propylene polymer material having a polymerised diene content, the dose is from 0.2 to 2 Mrad. But once again, there is no indication on the long chain branching.

EP-A-0821018 discloses the preparation of cross linkable olefinic polymers which have been subjected to ionising radiation. The specification exemplifies electron beams of relatively low energy and low doses to split polymeric chains in order to graft silane derivatives onto the polymeric chain. The specification does not address the problem of achieving high melt strength of polymers.

EP-A-0519341 discloses the grafting of vinyl monomers on particulate olefin polymers by irradiating the polymer and treating thereafter with a grafting monomer. In an example, polypropylene is irradiated with an electron beam having an energy of 2 MeV and subsequently treated with maleic anhydride as a grafting monomer.

U.S. Pat. No. 5,411,994 discloses the production of graft copolymers of polyolefins in which a mass of olefin polymer particles is irradiated and thereafter the mass is treated with a vinyl monomer in liquid form. The ionising radiation dose is about 1 to 12 Mrad and the ionising radiation preferably comprises electrons beamed from an electron generator having an accelerating potential of 500 to 4000 kV. The polymer is first irradiated and then treated with a grafting agent.

EP-A-0792905 discloses the continuous production of polypropylene mixtures of increased stress crack resistance and melt strength by the action of ionising radiation. The energy of the ionising radiation is from 150 to 300 keV and the radiation dose ranges from 0.05 to 12 Mrad.

The present invention aims to provide polypropylene resins having improved long chain branching as well as improved melt strength. More particularly the branching index of polypropylene of the invention should be lower than 0.7. It is also a goal of the invention to provide a process to prepare polypropylene with substantially increased long chain branching on the polypropylene molecules following the irradiation, while employing relatively low irradiation doses. It is a further aim to produce polypropylene having not only improved long chain branching and improved melt strength, but also improved recovery compliance and relaxation time.

Accordingly, the present invention provides for polypropylene having increased long chain branching particularly having a branching index of lower than 0.7 melt strength. It has been unexpectedly found that such improved long chain branching (LCB) polypropylene may be obtained by irradiating polypropylene with an electron beam having an energy of at least 5 MeV and with a radiation dose of from 5 to 100 kGray in the presence of a grafting agent for forming long chain branches on the polypropylene molecules.

It has also been unexpectedly found that such improved LCB polypropylene may be obtained with high energies owing to the conjoint use of a grafting agent during the irradiation step.

Such improvement has been found and finally measured through the determination of the branching index.

The branching index as mentioned in the present patent application is obtained by the ratio of weight average MW values inferred from rheological measurement at zero shear viscosity and at crossover points as fully described in Polymer Testing 11, 89 (1992) by K. Bernreitner et al.

Preferably, the polypropylene is irradiated at an energy of at least 10 MeV.

The polypropylene may be a homopolymer of propylene or a random or block copolymer of propylene and one or more olefins and/or dienes selected from ethylene and $C_4$ to $C_{10}$ 1-olefins or dienes, which may be linear or branched. The polypropylene homopolymer may be reinforced by rubber particles, for example ethylene-propylene rubber particles, typically in an amount of up to 30 wt %. The polypropylene may be a terpolymer optionally with a diene, for example norbornadiene, as a comonomer.

According to the present invention, the polypropylene to be irradiated is mixed prior to irradiation with the grafting agent which increases the long chain branching of the propylene molecules as a result of the irradiation. The grafting agent is directly incorporated into the propylene molecule during the irradiation step. The grafting agent includes at least one carbon-carbon double bond, and preferably is polyunsaturated, being for example bi, ter or tetra unsaturated. The non-conjugated unsaturated compounds are preferred, although conjugated saturated compounds may be employed. The grafting agent may contain polar groups, such as ester, anhydride, or imide groups and/or non-metallic elements such as silicon, phosphorous and halogen atoms. The grafting agent may be selected from the group consisting of bismaleimide derivatives; mono-, di-, tri-, tetra-acrylate or methacrylate compounds; organosilane compounds of the formula $A_{4-n}SiR_n$ where A are identical or different acrylate or methacrylate or vinyl groups, where R are identical or different alkoxy or acetoxy groups and where n is 1, 2, 3 or 4; α,β-unsaturated acids and their anhydride derivatives; non-conjugated dienes such as 1,5-hexadiene, norbornadiene and dicyclopentadiene; dipentene; polybutadiene and copolymers containing polybutadiene blocks; butadiene based polymers and copolymers; polyisoprene and copolymers containing polyisoprene blocks; isoprene based polymers and copolymers; polyethylene; $C_{4-20}$ α-olefins either linear or branched; styrene or divinylbenzene; ethylene-propylene rubbers and ethylene-propylene-diene rubbers; di-furnane derivatives; ester derivatives of fatty acids; and vinylpolybutadiene.

A particularly preferred grafting agent comprises tetravinyl silane.

The grafting agent employed in accordance with a preferred aspect of the invention results, following irradiation, in polypropylene molecules having some free end terminations, with a cross-link density which is not so high as to reduce the processability of the polymer.

In a further preferred aspect, functional monomers such as maleic anhydride, styrene, acrylic acid, methacrylic acid, 1,4-butanediol diacrylate, or ethylene glycol dimethacrylate may be incorporated into the polypropylene resin. These functional comonomers promote long chain branching of the polypropylene molecules.

In a particularly preferred embodiment of the invention, polypropylene homopolymer in fluff or powder form in an oxygen-free environment is mixed with a grafting agent. Preferably, the grafting agent comprises from 0.01 to 5 wt % of the weight of the polypropylene, more preferably from 0.01 to 1 wt % of the weight of the polypropylene. A particularly preferred grafting agent comprises tetravinyl silane in an amount of from 0.01 to 1 wt % based on the weight of the polypropylene, most particularly from 0.01 to 0.5 wt % based on the weight of the polypropylene.

The polypropylene/grafting agent mixture is thereafter deposited onto a continuously moving conveyor such as an endless belt. The mixture on the conveyor passes under an electron beam generator which irradiates the mixture. The accelerating potential or energy of the electron beam is at least 5 MeV, more preferably from 5 to 100 MeV, still more preferably at least 10 MeV, yet more preferably from 10 to 25 MeV. The power of the electron beam generator is preferably from 50 to 500 kW more preferably for 120 to 250 kW. The radiation dose to which the polypropylene/grafting agent mixture is subjected is preferably from 10 to 100 kGray, preferably around 15 kGray (10 kGray is equivalent to 1 Mrad). The conveyor speed is adjusted in order to achieve the desired dose. Typically, the conveyor speed is from 0.5 to 20 meters/minute, preferably from 1 to 10 meters/minute, more preferably from 2.25 to 8.5 meters/minute.

As a result of the high irradiating potential of the electron beam, not only can the conveyor speed be significantly higher than in the prior art, but also the thickness of the continuously moving bed of polypropylene/grafting agent mixture on the conveyor can be relatively high. Typically, the bed of polypropylene homopolymer and grafting agent has a thickness of up to 20 cm, most particularly from 5 to 10 cm. The bed of polypropylene homopolymer/grafting agent mixture on the conveyor typically has a width of up to about 1 meter. The irradiation is carried out under an inert atmosphere, such as nitrogen.

After irradiation by the electron beam, the polypropylene powder can be annealed and then treated with at least one known antioxidant additive. The annealing temperature may range from 50 to 150°, more preferably from 80 to 120° C. and the annealing time may range from 1 to 60 minutes, more preferably from 5 to 30 minutes. Thereafter the polypropylene is granulated.

In accordance with the invention, the irradiated polypropylene has increased recovery compliance, relaxation time and melt strength. These particular rheological properties provide an outstanding processing behaviour which allows the polypropylene based polymers produced in accordance with the invention to be suitable particularly for producing films, sheets, fibres, pipes, foams, hollow articles, panels and coatings. The irradiated polypropylene also has improved mechanical properties, such as flexural modulus and impact resistance.

The invention will now be described in greater detail with reference to the following non-limiting example and the accompanying drawing, in which:

FIG. 1 is a graph showing the relationship between melt strength and temperature for high melt strength polypropylene produced in accordance with an embodiment of the process of the invention and two other polypropylenes not produced in accordance with the invention.

EXAMPLE

In accordance with the example, a polypropylene homopolymer fluff in the form of a powder having a median particle size ($d_{50}$) of from 1000 to 1500 microns, a bulk density of around 0.5 g/cc and having a melt flow index (MFI) of 1.0 g/10 min was treated by irradiation. In this specification the melt flow index (MFI) is measured by the procedure of ASTM D 1238 using a load of 2.16 kg at a temperature of 230° C. The polypropylene powder had been treated under pure nitrogen since the presence of oxygen is detrimental to the irradiation process.

The polypropylene powder was then mixed with a grafting agent comprising tetravinyl silane in an amount of 0.5 wt % based on the weight of the polypropylene powder. Thereafter, the mixture of the polypropylene powder and the grafting agent was subjected to electron beam irradiation.

In particular, the polypropylene powder and grafting agent mixture was deposited onto an endless belt conveyor having a speed of 8.5 meters per minute. The polypropylene powder/grafting agent mixture was deposited onto the conveyor as a 1 meter wide bed having a thickness of 7 cm. The conveyor conveyed the bed underneath a high energy high power electron accelerator. Such accelerators are available in commerce. The accelerator had an energy of 10 MeV and a power of 120 kW. The polypropylene powder/grafting agent mixture was irradiated for a period of time (determined by the conveyor speed) sufficient to provide a radiation dose of 15 kGray. During the irradiation, the powder was maintained under nitrogen to exclude oxygen.

After irradiation, the powder was mixed with conventional antioxidant additives. Thereafter, the powder was granulated under nitrogen gas.

In order to demonstrate the benefits of the present invention, a number of samples were tested to determine their properties, with one of the samples being processed in accordance with the method of the present invention, and the remaining samples not being processed in accordance with the method of the present invention. Thus referring to Table 1, seven samples, with their respective treatments, are indicated.

Sample 3 corresponds to the above-described Example in which the specified polypropylene resin was irradiated by the electron beam at the dose and conveyor speed specified in Table 1, with the polypropylene having being mixed with tetravinyl silane grafting agent prior to irradiation.

The remaining samples 1, 2 and 4 to 7 are not in accordance with the invention but are included so as to show comparatively the benefits of the invention exemplified by sample 3.

Sample 1 corresponds to the same polypropylene as employed for sample 3, but which was not irradiated; in other words it was the original polypropylene material.

Sample 2 corresponds to the same polypropylene material which was subjected to irradiation under the dose and conveyor speed specified in Table 1, with the polypropylene not having been mixed with a grafting agent prior to irradiation.

Sample 4 corresponds to the same polypropylene which was subjected to the same irradiation treatment as sample 2, but then the polypropylene was annealed after the irradiation step to facilitate recombination of any remaining radicals. The annealing temperature was 120° and the annealing time was 30 minutes.

For each of samples 2 and 4, it may be seen that the dose of irradiation is significantly higher than that for sample 3 in accordance with the invention, and that the conveyor speed is significant lower than that for sample 3 of the invention. This is because in the absence of a grafting agent, in order to achieve a reasonable level of branching following irradiation, not only must the dose be very high but also the conveyor speed must be considerably lower in order to increase the irradiation time to ensure that a reasonable level of branching is achieved. This significantly reduces the production rate of the irradiated polypropylene. The higher dose required for samples 2 and 4 increases the production costs.

In Table 1, samples 5, 6 and 7 correspond to three respective commercially available polypropylene resins with melt flow index of around 3 g/10 min. Profax PF 184 is available in commerce from the company Montell North America, Inc. of Wilmington, Del., United States of America and comprises a polypropylene homopolymer which has been irradiated by a low density electron beam at a high irradiation dose. The product Daploy 130 D is a polypropylene resin available in commerce from the company PCD Polymere GmbH of Schwechat-Mannsworth, Austria. The product FINAPRO PPH 4060 is a polypropylene resin available in commerce from the company Fina Chemicals of Belgium. Samples 5 and 6 are high melt strength polypropylene resins with long chain branching and sample 7 is a linear polypropylene homopolymer. The branching index has been measured for all the samples and it can be seen from Table 1 the significant improvement in the long chain branching of the polypropylene of the invention.

By way of information, a linear polymer has a branching index of about 1 while a branched polymer presents a branching index lower than 1.

Referring to Table 2, the melt flow index (MFI) of each of the seven samples was measured. It will be seen that sample 3, corresponding to the polypropylene produced in accordance with the method of the present invention, had the lowest melt flow index of 0.86 g/10 min. This demonstrates that the use of grafting agent promotes the recombination of macroradicals and reduces the incidence of chain scission when compared to samples 2 and 4.

The MFI of sample 1 was increased by irradiation to form sample 2 as a result of chain scission caused by the radiation.

When a grafting agent is not used, there is no improvement at all for the long chain branching.

For samples 1 to 6 the mechanical properties of extrusion force at 250° C., melt strength at 250° C., 270° C. and 290° C. and speed at break 250° C., 270° C. and 290° C. were measured and the results are shown in Table 3. The melt strength is the force, measured in milliNewtons (mN) that is required to draw a polymer in the molten state. In this specification, the melt strength has been measured using a rheological device for capillary and tensile rheometry on polymer melts, such as a CEAST 1000 rheometer. In this specification, the polymer is melted and extruded through a capillary die. The extrusion force, or the force which is applied to the melt to be extruded through the capillary die at a constant flow rate, is measured in newtons (N). The filament is drawn by stretching or elongation as a result of being attached to a roll which is rotating with a constant acceleration of 10 rpm per 100 seconds, with an initial rotational speed of 2 rpm. The force required to draw the filament is recorded continuously and is expressed in milliNewtons (mN). The force increases with an increase in the rotational speed of the roll until the force reaches a plateau, which is recorded as the final value of the melt strength. It is this final value which is specified in Table 3. Additionally, the rotational speed at which the filament breaks is also determined and is expressed as an instantaneous rotational speed in rpm and corresponds to the speed at break specified in Table 3. It may be seen that for sample 3 produced in accordance with the invention, this shows a high level of melt strength, particularly over a range of processing temperatures and rather a low speed at break. Samples 5 and 6 lose their melt strength at 290° C. and are spinnable as a standard product. At 290° C. sample 3 has a good level of melt strength. In contrast, samples 2 and 4 show a limited increase of melt strength.

FIG. 1 shows for samples 3, 5 and 6 the relationship between melt strength and temperature. It may be seen that for sample 3, as compared to samples 5 and 6, the rate of decrease of melt strength of temperature is significantly reduced. Moreover, it may also be seen that the polypropylene of sample 3 still has a high melt strength at 290° C., while the polypropylenes of samples 5 and 6 have no significant melt strength at that temperature. Thus the process of the present invention enables the production of high melt strength polypropylenes which have good melt strength at high temperatures, enabling them to be processed, for example to produce spun fibres, at high processing temperatures.

It may be thus seen in accordance with the invention that the use of the process of the invention can provide a polypropylene having a high melt strength which is a strong advantage when the molten polymer is being processed, for example when being blown into film, extruded into pipes, spun into fibres, or formed as a foam.

Referring to Table 4, this shows the values of the flexural modulus and the impact resistance for sample 3 produced in accordance with the invention, and for samples 1, 5, 6 and 7. The flexural modulus was measured using the procedure of ISO 178 and the impact resistance was measured using the IZOD test at 23° C. of the procedure of ISO R180/1A. Comparing the polypropylene of sample 3 with that of sample 1, it may be seen that the use of high energy electron beam irradiation in combination with the grafting agent for forming long chain branches on the polypropylene molecules increases both the flexural modulus and the impact resistance of the polypropylene, while keeping substantially the same melt flow index. The mechanical properties of the polypropylene are improved, while maintaining substantially the same melt flow properties of the polypropylene. Comparing the polypropylene of sample 3 produced in accordance with the invention with those of samples 5, 6 and 7 which are commercially available polypropylenes, it may be seen that the flexural modulus of the polypropylene produced in accordance with the invention is either the same as or significantly greater than the flexural modulus of those known commercial polypropylenes, and also compared to all three samples 5, 6 and 7 sample 3 has a significantly higher impact resistance, for example at least about 50% higher than for the known polypropylene. Thus the process of the present invention enables a polypropylene having improved mechanical properties, as well as increased melt strength, to be achieved.

The recovery compliance and relaxation time were measured for samples 1 to 7 and the results are shown in Table 5. In accordance with the invention the recovery compliance and relaxation times of sample 3 are higher than that for samples 2 and 4 where no grafting agent was employed. Moreover, for sample 3 produced in accordance with the invention, the relaxation time was significantly higher than that for all the other samples. These results clearly show the advantage of adding a grafting agent prior to the irradiation step.

TABLE 1

| Sample | Treatment | Dose (kGray) | Conveyor Speed (m/min) | Branching Index |
|---|---|---|---|---|
| 1 | Non-irradiated PP | — | — | — |
| 2 | Irradiated PP | 60 | 2.1 | 0.89 |
| 3 | Irradiated PP in the presence of a grafting agent | 15 | 8.5 | 0.52 |
| 4 | Irradiated PP and annealed | 60 | 2.1 | 0.83 |
| 5 | Profax PF 814 | Not Known | Not Known | 0.72 |
| 6 | Daploy 130 D | Not Known | Not Known | 0.7 |
| 7 | FINAPRO PPH 4060 non-irradiated | — | — | 1.01 |

TABLE 2

| Sample | MFI(g/10$^8$) |
|---|---|
| 1 | 1.0 |
| 2 | 3.0 |
| 3 | 0.86 |
| 4 | 4.0 |
| 5 | 3.1 |
| 6 | 2.98 |
| 7 | 3.0 |

TABLE 3

| Sample | Extrusion force (daN) | Melt strength (mN) | | | Speed at break (rpm) | | |
|---|---|---|---|---|---|---|---|
| | | 250° C. | 270° C. | 290° C. | 250° C. | 270° C. | 290° C. |
| 1 | 8 | 8 | — | — | >240 | — | — |
| 2 | 3 | 17 | — | — | 35 | — | — |
| 3 | 8 | 45 | 35 | 15 | 3 | 3 | 3 |
| 4 | 3 | 17.5 | — | — | 35 | — | — |
| 5 | 3 | 50 | 20 | 1.5 | 9 | 25 | 170 |
| 6 | — | — | 40 | 2 | — | 5 | — |

TABLE 4

| Sample | Flexural modulus (MPa) | Impact resistance (kJ/m$^2$) |
|---|---|---|
| 1 | 1615 | 4.5 |
| 3 | 1955 | 7.3 |
| 5 | 1685 | 3.2 |
| 6 | 2020 | 5.5 |
| 7 | 1360 | 4.8 |

TABLE 5

| Sample | Recovery Compliance (1 × 10$^{-4}$/Pa) | Relaxation Time (sec) |
|---|---|---|
| 1 | 3.1 | 6.5 |
| 2 | 12.0 | 10.6 |
| 3 | 29.4 | 106.0 |
| 4 | 11.7 | 10.9 |
| 5 | 35.2 | 15.0 |

TABLE 5-continued

| Sample | Recovery Compliance ($1 \times 10^{-4}$/Pa) | Relaxation Time (sec) |
| --- | --- | --- |
| 6 | 49.8 | 28.3 |
| 7 | 5.5 | 2.9 |

What is claimed is:

1. Polypropylene having enhanced long chain branching and increased melt strength characterized in that it is produced by irradiating polypropylene with an electron beam having an energy of at least 5 MeV with a radiation dose of from 5 to 100 kGray in the presence of a grafting agent.

2. A polypropylene according to claim 1 wherein said electron beam energy is at least 10 MeV.

3. A polypropylene according to claim 1 or 2 wherein the grafting agent is selected from the group consisting of bismaleimide derivatives; mono-, di-, tri-, tetra-acrylate or methacrylate compounds; organosilane compounds of the formula $A_{4-n}SiR_n$ where A are identical or different acrylate or methacrylate or vinyl groups, where R are identical or different alkoxy or acetoxy groups and where n is 1, 2, 3 or 4; α,β-unsaturated acids and their anhydride derivatives; non-conjugated dienes such as 1,5-hexadiene, norbornadiene and dicyclopentadiene; dipentene; polybutadiene and copolymers containing polybutadiene blocks; butadiene based polymers and copolymers; polyisoprene and copolymers containing polyisoprene blocks; isoprene based polymers and copolymers; polyethylene; $C_{4-20}$ α-olefins either linear or branched; styrene or divinylbenzene; ethylene-propylene rubbers and ethylene-propylene-diene rubbers; di-furnane derivatives; ester derivatives of fatty acids; and vinylpolybutadiene.

4. A polypropylene according to claim 1 or claim 2 wherein the grafting agent comprises from 0.01 to 5 wt. % of the weight of the polypropylene.

5. A polypropylene according to claim 1 or claim 2 wherein the grafting agent comprises tetravinyl silane.

6. A polypropylene according to claim 5 wherein the tetravinyl silane is in an amount of from 0.01 to 1 wt % based on the weight of the polypropylene.

7. Polypropylene having a branching index of lower than 0.7 and an improved melt strength obtained by irradiating a polypropylene with an electron beam energy of at least 5 MeV with a radiation dose of 5 to 100 kGray in the presence of a grafting agent.

8. A polypropylene according to claim 1 wherein said radiation dose is at least 10 kGray.

9. A polypropylene according to claim 8 wherein said electron beam energy is at least 10 MeV.

10. A polypropylene according to claim 9 wherein said radiation dose is at least 15 kGray.

11. A process for the production of polypropylene having an enhanced long chain branching and a high melt strength comprising:

a. providing a mixture of polypropylene and a grafting agent;

b. irradiating said mixture of polypropylene and grafting agent with an electron beam having an energy of at least 5 MeV with a radiation dose of 5–100 kGray to produce a polypropylene polymer having a enhanced long chain branching; and c. recovering polypropylene polymer having a branching index which is lower than the branching index of a linear polypropylene.

12. The process of claim 11 wherein said polypropylene is irradiated with an electron beam having an energy level of at least 10 MeV.

13. The method of claim 12 wherein said polypropylene is irradiated with a radiation dose of at least 10 kGray.

14. The method of claim 12 wherein said polypropylene is irradiated within a radiation dose of at least 15 kGray.

15. The method of claim 11 wherein said branching index is less than 0.7.

* * * * *